(12) United States Patent
Angel et al.

(10) Patent No.: US 7,650,523 B2
(45) Date of Patent: Jan. 19, 2010

(54) INTERFACE APPARATUS AND METHOD FOR SYNCHRONIZATION OF DATA

(75) Inventors: Jörn Angel, Bochum (DE); Georg Stäbner, Ratingen (DE)

(73) Assignee: Infineon Technologies AG, Munich (DE)

( * ) Notice: Subject to any disclaimer, the term of this patent is extended or adjusted under 35 U.S.C. 154(b) by 525 days.

(21) Appl. No.: 11/511,758

(22) Filed: Aug. 29, 2006

(65) Prior Publication Data

US 2007/0064846 A1 Mar. 22, 2007

Related U.S. Application Data

(63) Continuation of application No. PCT/DE2005/000341, filed on Mar. 1, 2005.

(30) Foreign Application Priority Data

Mar. 1, 2004 (DE) .................. 10 2004 010 562

(51) Int. Cl.
- *G06F 1/12* (2006.01)
- *G06F 1/04* (2006.01)
- *H04L 7/00* (2006.01)

(52) U.S. Cl. .................. 713/400; 713/401; 713/500; 713/501; 713/502; 713/503; 713/600; 375/354; 375/355

(58) Field of Classification Search .............. 713/400, 713/401, 500, 501, 502, 503, 600; 375/354, 375/371–376, 355
See application file for complete search history.

(56) References Cited

U.S. PATENT DOCUMENTS

| | | | |
|---|---|---|---|
| 4,426,713 A | 1/1984 | Shimizu et al. | |
| 5,056,120 A * | 10/1991 | Taniguchi et al. | 375/371 |
| 5,909,563 A * | 6/1999 | Jacobs | 710/305 |
| 7,046,057 B1 * | 5/2006 | Culler | 327/156 |
| 7,269,754 B2 * | 9/2007 | Ramaswamy et al. | 713/401 |
| 2001/0045822 A1 | 11/2001 | Davidsson et al. | |
| 2004/0044919 A1 * | 3/2004 | Dabral | 713/400 |

FOREIGN PATENT DOCUMENTS

| | | |
|---|---|---|
| EP | 0 351 779 A2 | 1/1990 |
| WO | WO 98/13768 A2 | 4/1998 |
| WO | WO 00/49485 A1 | 8/2000 |

* cited by examiner

*Primary Examiner*—Thomas Lee
*Assistant Examiner*—Fahmida Rahman
(74) *Attorney, Agent, or Firm*—Eschweiler & Associates, LLC

(57) ABSTRACT

An interface apparatus is provided having a first register device and a second register device, which is connected in parallel with it. The register devices are configured to receive a data word. The interface apparatus includes a synchronization circuit, to which a first and a second clock signal is supplied and which is configured to emit a selection signal, which is derived from the first clock signal, for selection of the first or second register device for storage of a data word. The synchronization circuit is also configured to emit a control signal derived from the selection signal and the second clock signal, at a control output. The control output is coupled to a selection circuit, by means of which the output of one of the two register devices can be connected to the data output of the interface apparatus. Comparison of the selection signal with the second clock signal means that there is no need for an additional registration device.

20 Claims, 3 Drawing Sheets

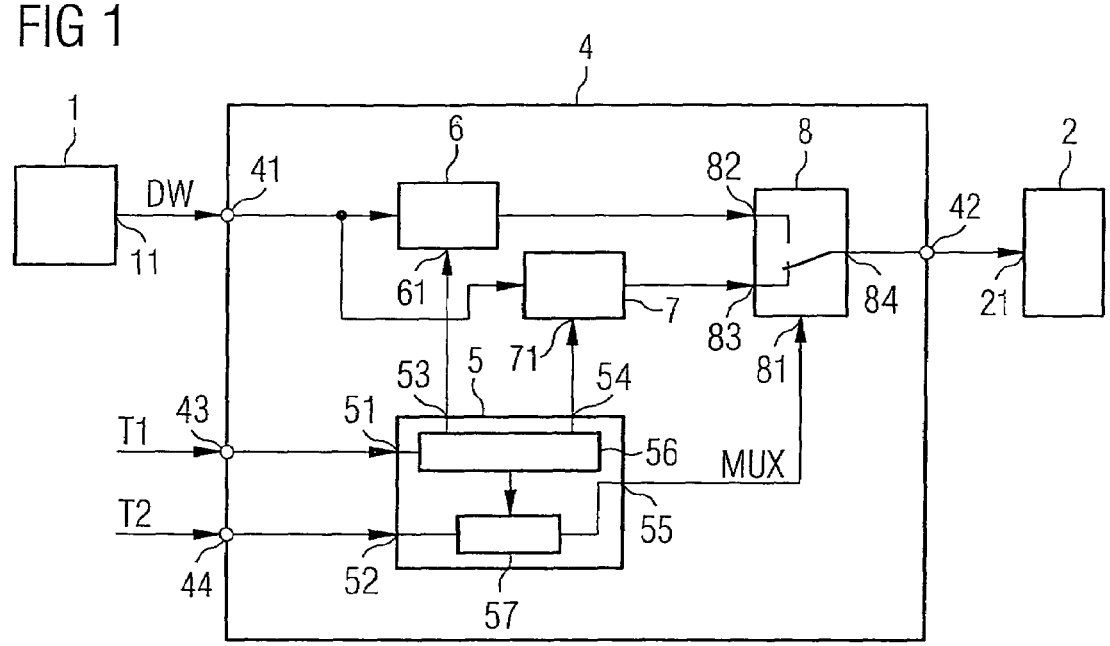
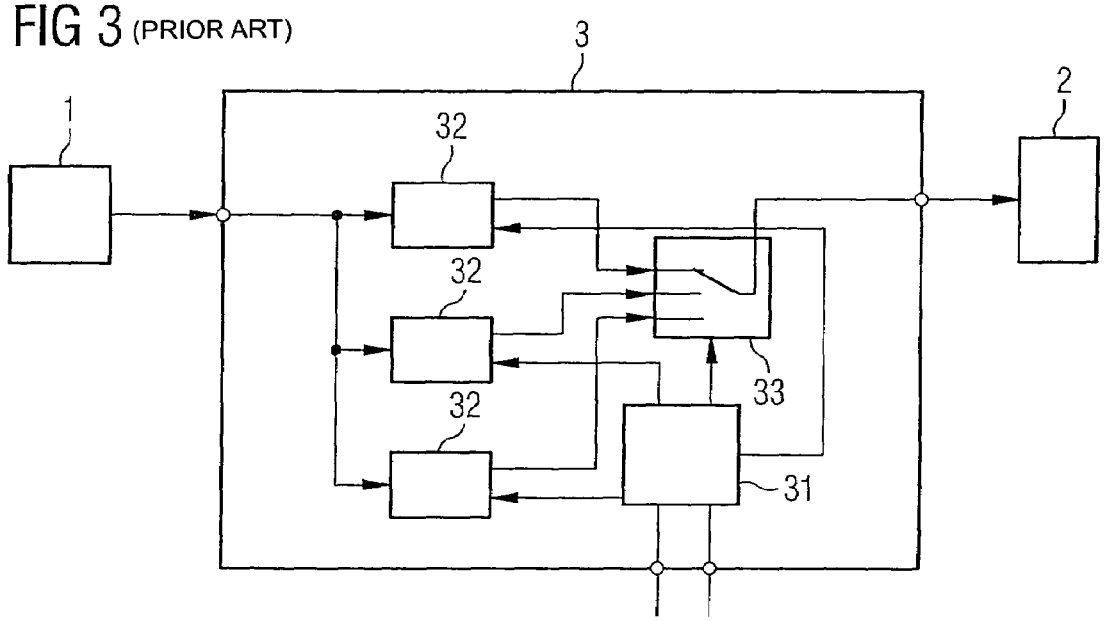

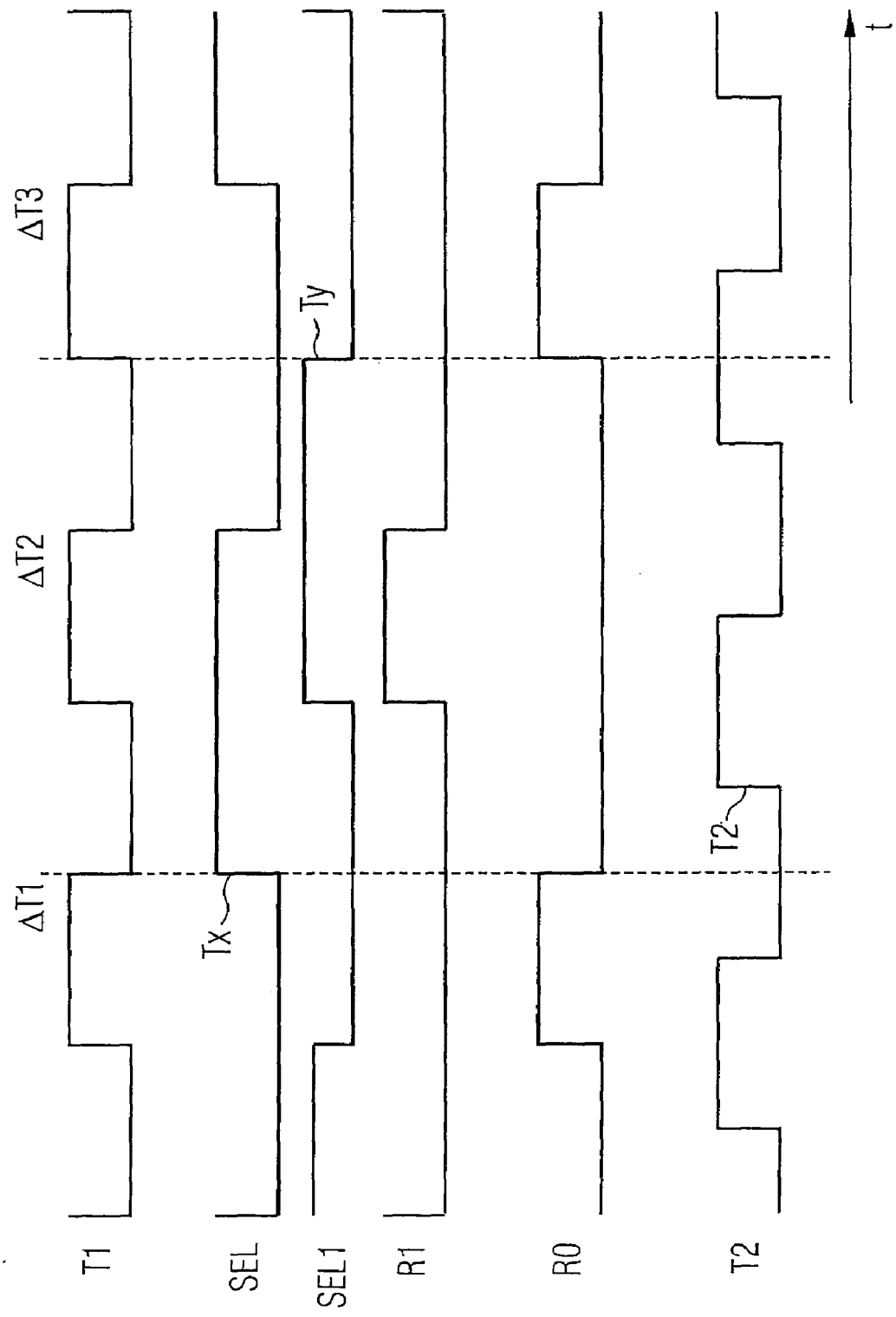

INTERFACE APPARATUS AND METHOD FOR SYNCHRONIZATION OF DATA

REFERENCE TO RELATED APPLICATIONS

This application is a continuation of PCT/DE2005/000341 filed Mar. 1, 2005 which was not published in English, that claims the benefit of the priority date of German Patent Application No. DE 10 2004 010 562.6, filed on Mar. 1, 2004, the contents of which both are herein incorporated by reference in their entireties.

FIELD OF THE INVENTION

The invention relates to an interface apparatus for the synchronous transmission of a data word, and to a method for synchronization of a data word between two circuit blocks which are clocked at the same frequency.

BACKGROUND OF THE INVENTION

In clocked systems, data frequently has to be interchanged between two different circuit blocks. The individual circuit blocks may in this case, for example, interchange data which is then processed further in the respective circuit blocks. The two circuit blocks are each clocked with a clock signal at the same frequency. In order to avoid data errors during the data interchange, the data interchange must be carried out synchronously, that is to say the data to be interchanged must always be applied to the circuit blocks at the correct times.

Because the circuit blocks are arranged at different locations, delay-time differences can occur between the two clock signals from the circuit blocks. Lines of different lengths for the two clock signals likewise lead to delay-time differences. A delay-time difference results in a phase difference between the clock signals from the two circuit blocks. In addition, an unknown phase difference between the two clock signals is caused by a slight random variation, which is referred to as "a jitter" and by different frequency-processing measures. If the frequencies of the clock signal are the same, but originate from different signal sources, then the phase angles between them are generally unknown.

When data is being interchanged, a circuit block emits the data to be interchanged at its output during one clock cycle, for example on a rising flank of its clock signal. The second circuit block reads the data applied to its input, for example on a rising clock flank of its clock signal, and processes this data further. Because of the phase difference between the two clock signals in the circuit blocks, the production at the data output and the reading process at the data input each take place at different times. It is thus possible for a read cycle to have already started before the first circuit block has produced the data to be transferred at its data output. This results in a loss of data, and thus to an error in the data transmission between the blocks.

In order to avoid such loss of data, synchronization circuits and, in particular, so-called FIFO buffers (FIFO=First-in, First-out) are connected between the individual circuit blocks. The buffer circuits temporarily store the data to be transferred in flipflop circuits, and emit it again when required. In this case, the data that is the first to be stored in the buffer is also the first data that is output again.

FIG. 3 shows one example of a synchronous interface with a FIFO buffer. The synchronization circuit 3 is in this case connected between the two circuit blocks 1 and 2. The circuit block 1 emits a data word at its output during each clock period of its clock signal. The data word comprises one or more data items and is stored in one of the three parallel-connected register banks 32. The register banks 32 in this case each have a plurality of parallel-connected flipflop circuits, which each store one data item from the data word. The selection of which of the three register banks 32 is used to store the data word of the circuit block 1 is made by the control device 31. The stored data word is read via a multiplexer unit 33, which uses a control signal from the control unit 31 to connect one of the three register banks 32 to the output of the synchronization circuit 3, and thus supplies the data word to the second circuit block 2. In this case, the data word is emitted in the sequence in which it was also stored in the register banks 32.

After the process of reading from a data bank and production at the second circuit block, the contents of the register bank are deleted, and this register bank is enabled for another writing process again. The reading and writing processes are synchronized via the control device 31, to which the clock signals from the circuit block 1 and from the circuit block 2 are supplied.

If the data reading and writing processes are carried out using two different clock signals at the same frequency, there must be at least three memory locations for each data item to be synchronized. 3*N memory locations are therefore required for synchronization of n parallel data items which form a data word. Each of the described register banks 32 thus contains n memory locations. The third register bank is required in order to ensure that major fluctuations in the phase angle between the clock signal of the first circuit block and the clock signal of the second circuit block are coped with in both the positive and negative directions. Particularly in the case of circuit blocks whose data word to be synchronized comprises a very large number of parallel data items, the need for a third memory location per data item in the synchronization circuit leads to a large number of memory locations. This increases the space requirements and results in additional costs.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention is directed to an interface apparatus that requires only two register banks for synchronization. The invention is also directed to a method for synchronization of a data word between two circuit blocks, which are clocked at the same frequency, using simple means.

According to one embodiment of the invention, an interface apparatus for synchronous transmission of a data word has a data input for the data word, and a data output for the data word. A first register device and a second register device, which is connected in parallel with the first, each have one input which is coupled to the data input, as well as a selection input and an output. The first and second register devices are coupled to store a data word applied on the input side and to emit the data word at the output. The interface apparatus also has a selection circuit, which is connected to the output of the first register device and to the output of the second register device. The selection circuit is configured to couple the output of the first or second register device to the data output as a function of a control signal. The selection circuit thus forms a multiplexer unit. The interface apparatus also has a first clock input configured to receive a first clock signal, and a second clock input configured to receive a second clock signal. In addition, the apparatus contains a synchronization device, which is coupled to the selection circuit by the first and second clock input and by a control output. The synchronization device is configured to emit a selection signal (which is derived from the first clock signal) for selection of the first or the second register device for storage of a data word applied to the data input. The device is thus configured to emit a selection signal to the first and the second register devices. Furthermore, the synchronization device is configured to emit the control signal at the control output, with the control signal being derived from the selection signal and the second clock signal.

The synchronization device and the selective drive for the first and second register devices mean that there is no need for a third register device with additional memory locations. The synchronization between the clock signals of the two circuit blocks is concentrated on the synchronization device, instead of having to use the three register banks for this purpose, as in the past. This device need be provided only once for the entire interface apparatus, and ensures that the data to be interchanged between the circuit blocks is produced without errors and at the correct time at the output of the interface apparatus according to the invention. In particular, the data word to be transmitted is produced at the output of the interface apparatus according to the invention, at the time at which the circuit block is receiving a data word, which has been applied to its input, and is processing it further.

This is done in one example by time evaluation of the selection signal with the second clock signal, and by deviation of the control signal as a function thereof. The complexity to implement the invention is thus reduced ever further for synchronous interchange of a large number of parallel data items, in comparison to the conventional implementation with three register banks.

In this case, it is particularly advantageous, in one advantageous refinement, for the first and the second register device to have a clock signal input which forms the selection input. The first and the second register devices are in this case configured to emit a data word (which is applied to their data input) at their output on a flank of the clock signal, which is derived from the selection signal. These register devices, which are known from the prior art, can thus still be used. The register devices in this case contain a plurality of parallel-arranged flipflop circuits for each individual data item in the data word.

In order to improve the data protection, a first buffer circuit is in one embodiment of the invention connected between the data input of the interface apparatus and the first and second register devices. This buffer circuit is configured to emit a data word (which has been applied to the data input of the interface apparatus) to the first and the second register devices on a clock flank of the first clock signal. In one example, this is the falling clock flank. This ensures that a valid data word is applied to the data input of the first and second register devices when the first and second register devices receive the data word at their data input on a rising flank of the applied clock signal.

In another development of the invention, a second buffer device is connected between the selection means and the data output of the interface apparatus, and is configured to emit a data word (which has been emitted at the data output of the selection circuit) at the output of the interface apparatus on a falling clock flank of the second clock signal. This ensures that the data word which has been synchronized with the second clock signal is reliably produced at the data output of the interface apparatus on a rising clock flank of the second clock signal. The data word can thus be transferred to the circuit block for further processing, with this clock flank of the second clock signal. Alternatively, the direction of the clock flanks in the first and second buffer circuits can also be interchanged.

In one embodiment of the invention, the synchronization device comprises a selection circuit or a selector, which is configured to produce the selection signal for selection of the respective other register device during each clock period of the first clock signal. The selection signal is formed such that this results in the two register devices being selected alternately. The frequency of the selection signal corresponds to half the frequency of the first clock signal. The selection circuit or the selector has a D-toggle flipflop, in one example, which is clocked with the first clock signal. The data output of the toggle flipflop is coupled to a first input of a first logic gate, and via an inverter to its first input of a second logic gate, as well as to its data input. The D-toggle flipflop with feedback thus acts as a frequency divider, which halves the frequency of the first clock signal. As an alternative to this, it is possible to use any other circuit which produces a clock signal at half the frequency of the input clock.

In one embodiment of the invention, a second input of the first logic gate and a second input of the second logic gate are coupled to the first clock input, and the output of the first logic gate is coupled to the selection input of the first register device, in order to emit the selection signal. The output of the second logic gate is coupled to the selection input of the second register device. This logic circuitry results in a clock signal at half the frequency of the first clock signal being applied to the selection input of the first register device and to the selection input of the second register device. The signals which are applied to the selection inputs of the register devices are phase-shifted through 90° with respect to one another. A selection signal can thus be produced in a simple manner, which can also be used as a clock signal for the first and second register devices, which each alternately read a data word at the synchronization input of the synchronization device.

In another embodiment of the invention, the synchronization device has a sampling apparatus which is clocked with the second clock signal. The sampling apparatus is configured to detect a change in the selection signal, and to emit the control signal to the selection circuit. The control signal is in this case connected such that it connects the output of that register device which has been selected by the selection signal to the data output of the interface apparatus. A design such as this is particularly advantageous since the sampling apparatus thus uses the selection signal to detect the register device which has stored the next data word to be synchronized.

As soon as a change is registered which indicates a new register device, the control signal is emitted to the selection circuit. The synchronization device is configured such that the data output of the selected register device is connected to the data output of the synchronization device. This ensures that the register device is connected to the output of the synchronization device only when the register device is emitting a valid data word.

In another advantageous embodiment, the sampling apparatus has a first and at least one second flipflop circuit in order to detect a change. The selection signal can be supplied to the data inputs of the first and of the at least one second flipflop circuit. A clock input of the first flipflop circuit is connected to the second clock input, and a clock input of the at least one second flipflop circuit is connected via at least one first delay element to the second clock input. The delay element is in this case configured to produce a time delay for the second clock signal. The embodiment with at least two flipflop circuits whose clock signal inputs are connected to the second clock input thus makes it possible to detect the time of a signal change in the selection signal. This indicates the register device which contains the next data word to be emitted. In addition, it is advantageous for the sampling apparatus to contain a third flipflop circuit, whose clock input is coupled via a second delay element to the second clock input. The data input of the third flipflop circuit is connected via at least one logic gate to the data outputs of the first and of the at least one second flipflop circuit. The logic circuit is in this case configured to evaluate the time detection of a change in the selection signal by the first and the at least one second flipflop circuit. The data output of the third flipflop circuit is connected in one example to the control input of the selection circuit. The control signal from the synchronization device can thus be tapped off at the data output of the third flipflop circuit.

In addition to provision of a first register device and a second register device for a data word which is emitted from the first circuit block, the method for synchronization of a data word comprises selection of one of the two register devices by means of a selection signal. The value of the selection signal is associated with in each case one of the register devices. Furthermore, a data word which has been emitted from the first circuit block is transferred to the selected register device with a rising clock flank of a first clock signal. The selection signal is detected by evaluation of the time response of the selection signal, using a second clock signal. This detects which of the two register devices has been selected for transfer of the data word emitted from the circuit block. The transferred data word is emitted to the second circuit block, after such detection, on a rising clock flank of the second clock signal. Thus, according to the invention, the synchronization is concentrated on detection of a level change in the selection signal. This detection is carried out by time evaluation of a comparison of the selection signal with the second clock signal.

Only two register devices are therefore required for synchronization, to which the data word to be synchronized is transferred alternately. As soon as it is certain that the register device has received the data word applied to the input of the interface apparatus, this data word is emitted at the data output, using the clock of the second clock signal.

In this context, it is advantageous for the selection signal to be produced at a first and at a second logic level. The first and the second logic level is inverted with each clock period of the first clock signal, with each logic level being associated with one of the two register devices. The selection signal is thus a signal whose level is inverted with each period of the first clock signal. In one embodiment, the selection signal is produced from the first clock signal by halving the first clock signal. The logic-high level is in this case associated with the first register device, and the logic-low level with the second register device. In one example, the selection signal can thus be used directly for production of a clock signal for the register devices.

In one embodiment, a phase shift of half a clock period of the first clock signal is provided for this purpose, for the respective selection signals at the clock input of the first and second register devices. These signals can be produced by application of the selection signal and of the first clock signal to a first logic gate, and inversion of the selection signal and application of the inverted selection signal and of the first clock signal to a second logic gate.

In another embodiment, a third and a fourth clock signal are produced with a duty ratio of 3:1, with the third clock signal having a phase shift of half a clock period with respect to the fourth clock signal. The third clock signal is supplied to the clock input of the first register device, and the fourth clock signal is supplied to the clock signal of the second register device. The register devices thus receive a data word which has been emitted from the first circuit block, on a rising clock flank at the clock input.

In one example, the selection signal is detected by detection of a clock flank of the selection signal by means of logic evaluation. The precise time detection is in this case carried out by delaying the second clock signal and subsequently supplying the second, delayed, clock signal to a clock input of a flipflop circuit. The data output of the flipflop circuit is switched as a function of the delay, only when a level change occurs in the selection signal. The output signals at the data output of the flipflop circuits are evaluated in the logic circuit, and this is used to determine the time at which the data word which has been stored in the registration device can be transferred to the output of the synchronization device.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in detail in the following text, using exemplary embodiments and with the assistance of the drawings, in which:

FIG. 1 is a block diagram illustrating a first exemplary embodiment of the invention, FIG. 3 shows a known interface apparatus, and FIG. 4 is a timing diagram illustrating selected signals within the interface apparatus.

DETAILED DESCRIPTION OF THE INVENTION

Figure 2:
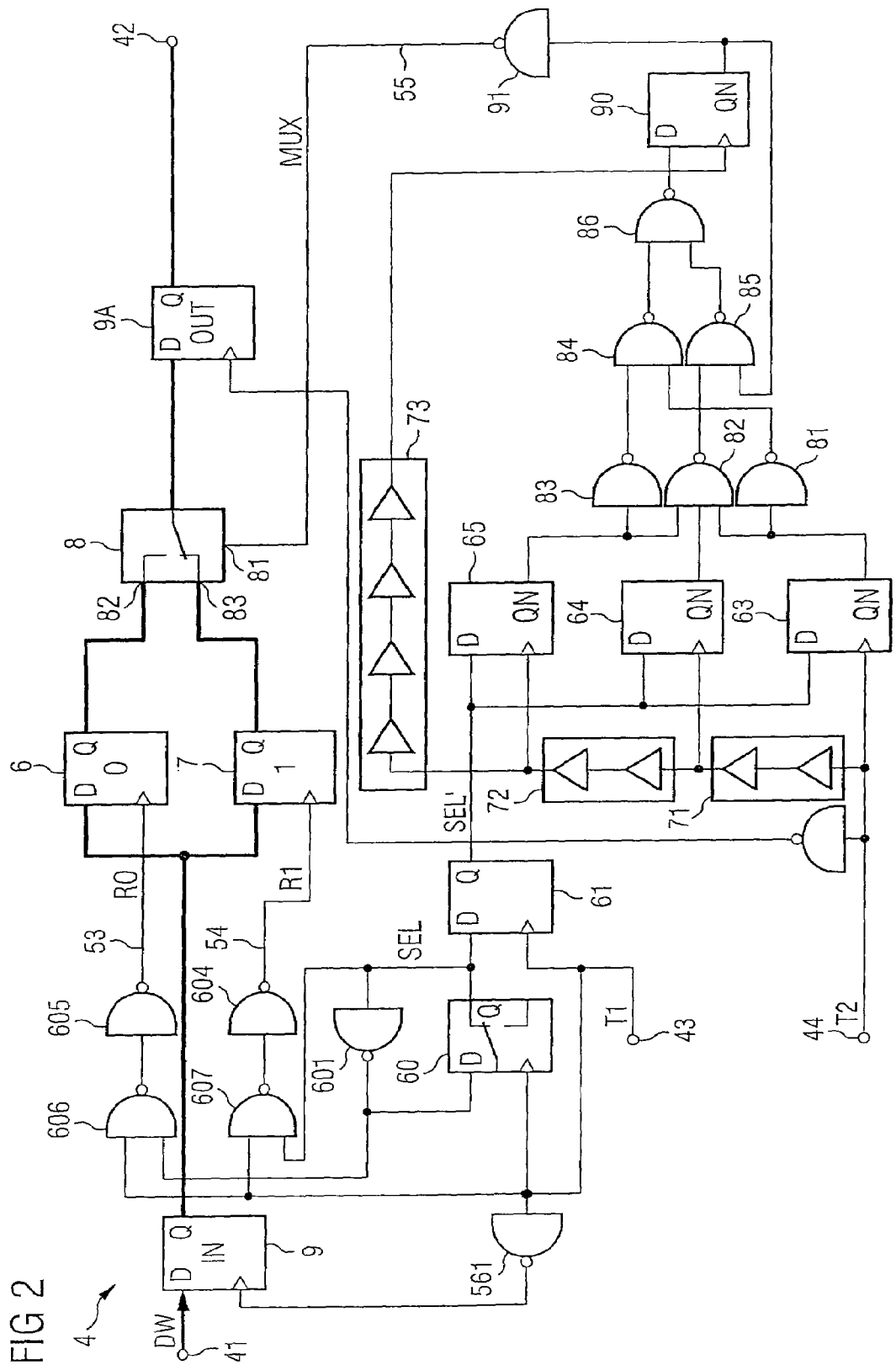
FIG. 2 is a logic diagram illustrating an interface apparatus.

FIG. 1 shows a schematic block diagram with the interface apparatus according to one embodiment of the invention. An interface is required when data is interchanged between different blocks, with the circuit blocks each being clocked by their own clock signal. The clock signal for the first circuit block and that for the second circuit block are at the same frequency, but their phase angles differ from one another. In addition, they can be changed by jitter and natural fluctuations. The interface apparatus allows data to be interchanged synchronously between the circuit blocks. The expression synchronously should in this case be understood as meaning that the data word which is applied to the input of the interface apparatus is emitted at the correct time at its output when the second circuit block is in fact ready to receive it. The "synchronous" interchange thus ensures that the correct data word to be interchanged is received by the second circuit block with a clock flank of the second clock signal.

For this purpose, an interface apparatus 4 according to the invention is connected between the output 11 of a first circuit block 1, and the input 21 of a second circuit block 2. The interface apparatus 4 contains a data input 41 for the data word to be transmitted, which data input 41 is connected to the input 11 of the first circuit block, as well as a data output 42 for emitting a data word, which data output 42 is connected to the input 21 of the second circuit block 2. In addition, the interface apparatus according to the invention has two clock inputs 43 and 44. A clock signal T1 is applied to the first clock input 43, and is also the clock signal from the first circuit block 1. A second clock signal T2 is applied to the second clock input 44, and is likewise used as the clock signal for the second circuit block 2. The two inputs are thus configured for clock signals from the first and second circuit blocks 1, 2.

The data input 41 is in each case connected to a first register device 6 and to a register device 7 connected in parallel with it. The two register devices 6 and 7 temporarily store a data word DW, which has been applied to the data input 41, and each emit this at their output. The storage and emission of the data word are controlled via a respective control input 61 and 71 for the register devices 6 and 7. The outputs of the register devices 6 and 7 are connected to a multiplexer unit 8. The unit 8 represents a switch which connects one of its two inputs 82 or 83 to its output 84 depending on a control signal at its control input 81. The output 84 of the multiplexer unit 8 is connected to the data output 42 of the interface apparatus 4.

The interface apparatus 4 also has a synchronization device 5. The synchronization device 5 has two inputs 51 and 52. The first input 51 is connected to the first clock input 43, and the second input 52 is connected to the second clock input 44. The device 5 contains a selection circuit or selector 56. The selection circuit 56 uses the clock signal at the input 43 to produce a selection signal. The selection signal is emitted as a selection signal either at the output 53 or at the output 54. The selection circuit 56 uses the selection signal to select the register device 6 or 7, respectively, so that the selected register device temporarily stores the next data word DW which is applied to the data input 41.

By way of example, the selection circuit 56 produces a selection signal, and emits this at the data output 53. The selection signal is emitted at the output 53 with the next rising clock flank of the first clock signal at the clock input 43. The rising clock flank of the first clock signal also results in a data word DW, which has been emitted from the circuit block 1, being applied to the data input 41. The register device 6 is driven by the selection signal at the output 53 such that it temporarily stores the data word DW which is applied to the data input 41. The selection circuit produces a selection signal at the output 54 with the next rising clock flank of the first clock signal at the clock input 43, so that the register device 7 is driven. Since this clock flank results in a new data word being applied to the data input 41, this is now transferred to the register device 7.

At the same time, the selection circuit 56 emits the selection signal to a sampling apparatus 57. The sampling apparatus is connected to the second input 52, and thus to the second clock input 44 for the second clock signal. The sampling apparatus 57 is configured such that it uses the selection signal to identify the register device 6 or 7 in which the data word DW which has been applied to the data input 41 is stored. This is done, by way of example, by the selection signal level changing from a first level to a second level, with the change indicating the time for transferring the data word to the correspondingly selected register device. As soon as the sampling apparatus 57 registers a change in this way, the transferred data word is emitted at the data output of the selected register device. The data word can thus be passed on from this time to the data output 42 of the interface apparatus 4.

For this purpose, the sampling apparatus 57 uses the second clock signal at the second clock input 44 and the change in the selection signal to produce a control signal MUX at the control output 55. The control output 55 is connected to the control input 81 of the data multiplexer 8. The multiplexer 8 thus always switches at the input 81, as a function of the control signal MUX, at the time which ensures that a valid data word is present at the corresponding input 82 or 83. The selection circuit 56 and the sampling apparatus 57 register a phase shift between the two clock signals in the positive direction and in the negative direction, and control the switching of the multiplexer unit 8 such that the data words which have been applied to the data input 41 of the synchronization circuit 4 are emitted with clock and phase synchronization with respect to the second clock signal at the second clock input 44, at the data output 42 of the interface apparatus 4. This results in data being interchanged synchronously with the clocks of the two circuit blocks 1 and 2.

FIG. 2 shows a detailed exemplary embodiment of the interface apparatus 4. The same components in this case have the same reference symbols. The interface apparatus according to the invention illustrated in FIG. 4 is controlled by positive clock flanks. A positive clock flank is a rising clock flank, while a negative clock flank is a falling clock flank.

The interface apparatus shown in FIG. 2 is configured for synchronous interchange of a data word comprising a plurality of parallel data items between two circuit blocks. In the present example, six parallel data items in each case form one data word. The interface apparatus described here may, however, also be used for synchronization of data words with a considerably greater number of parallel data items. All that is necessary to do so is to increase the number of parallel flipflop circuits in the individual components on the data path that is marked by a thick line.

The data input 41 for the data word DW is connected to one input D of a buffer circuit 9 comprising a plurality of parallel-connected flipflop circuits. The outputs of the parallel-connected flipflop circuits form the output Q of the data buffer 9, and are in each case connected to the input D of the register devices 6 and 7. The register devices 6 and 7, which are also referred to as register banks 6 and 7, likewise comprise a plurality of parallel-connected flipflop circuits. In this case, a flipflop circuit is intended to store one data item from the data word. The outputs Q of the register devices 6 and 7 are connected to a multiplexer unit by the inputs 82 and 83, respectively.

The output 84 of the multiplexer unit 8 is in turn connected to a data input D of a second buffer circuit 9A. The buffer circuit 9A has the same number of parallel-connected flip-flops as the buffer circuit 9 and emit their data at their respective outputs Q to the data output 42. The input buffer 9, like the output buffer 9A, are optional components of the interface apparatus 4 according to the invention, which allow additional reliability in the provision of the data. The two buffer circuits prevent reading and writing errors in the register devices.

The clock signal input of the buffer circuit 9 is connected via an inverter 561 to the first clock input 43 for the first clock signal T1. On a falling or a negative clock flank of the first clock signal T1, the buffer circuit 9 reads a data word which has been applied to the input 41, and once again emits this at its data output Q.

After inversion by the inverter 561, the clock signal T1 is also supplied to a clock signal input of a D-toggle flipflop 60. The data input D of the D-toggle flipflop 60 is in this case connected via an inverter 601 to the data output Q of the D-toggle flipflop 60. The output of the D-toggle flipflop 60 is fed back to its input, and thus inverts its output Q on each falling clock flank of the first clock signal T1. It thus also acts as a frequency divider. The signal which is emitted at its output is the selection signal SEL for the selection of the register device 6 or 7 which is the next to receive a data word.

The output Q of the D-toggle flipflop 60 is also connected to a first input of a logic AND gate 607, whose second input is connected to the first clock input 43. The data input of the D-toggle flipflop 60, which is connected to the output of the inverter 601, is, furthermore, also connected to a first input of a second logic AND gate 606. The second input of the logic AND gate 606 is connected to the first clock input 43. The outputs of the logic AND gates 606 and 607 each lead to a respective inverter 605 or 604. The output of the inverter 605 forms the output 53 for the selection signal R0. The output of the inverter 604 forms the output 54 for the signal R1, and is connected to the clock signal input of the register device 7. Like the selection signal R1 as well, the selection signal R0 thus forms a clock signal for the register devices 6 and 7. When a rising or positive clock flank of the respective output signals R0 or R1 occurs, these receive a data word DW, which has been applied to their data input D, in their buffer store, and emit this at the output Q. The clock inputs of the two register devices 6 and 7, respectively, thus represent the two selection inputs 61 and 71, respectively, as shown in FIG. 1. The flipflop 60 and the logic gates 606 and 607 form the selection circuit 56.

The logic gates 606 and 607 use the selection signal SEL and the first clock signal T1 to produce the selection signals R0 and R1, which each have a duty ratio of 1:3. The clock period of the two signals R0 and R1 is twice as long as the clock period of the first clock signal T1. In addition, the two signals R0 and R1 are each phase-shifted with respect to one another by half the period of their clock. In consequence, the first register device 6 receives the data word applied to its data input on a rising clock flank of the first clock signal T1, and emits this at the output Q. On the next rising clock flank of the first clock signal T1, the second register device 7 receives the data word DW applied to its data input D. The data word applied to the input is thus always received alternately by the register device 6 or 7 in each clock period, and is passed on to their respective output.

The information as to which of the two register devices 6 or 7 the data word is transferred first is important for synchronous data interchange. The flipflop circuit 61 is used for this purpose, with its data input being connected to the data output Q of the toggle flipflop 60. The clock input of the flipflop 61 is connected to the first clock input. Information as to which of the two register devices 6 or 7 has up-to-date data currently applied to it is thus passed on with each rising clock flank of the first clock signal T1 to the output Q of the flipflop circuit 61, in the form of the selection signal SEL' (SEL1 in FIG. 4). The flipflop circuit 61 at the same time forms the interface which logically links the first clock signal T1 and the second clock signal T2, in order to ensure error-free data interchange in this way.

The selection switch 8 is now intended to be switched such that it connects that register device to which new data is applied to the buffer circuit 9A. In the illustrated exemplary embodiment, this is done with the rising flank of the output clock T2, so that the data which is applied to the data input D of the buffer circuit 9A can be transferred in synchronism with the falling output flank of the second clock signal to the buffer circuit 9A, and can be emitted at the data output 42 of the interface apparatus 4.

For this purpose, the output Q of the flipflop circuit 61 is connected to in each case one data input of a first, second and third sampling flipflop 63, 64, 65. The clock signal input of the first sampling flipflop 63 is connected to the second clock input 44 of the interface apparatus according to the invention. The clock signal input of the second sampling flipflop 64 is connected via a delay element 71 to the second clock input. The clock input for the third sampling flipflop 65 is itself coupled via the delay element 72 and the delay element 71 to the second clock input 44. The two delay elements 71 and 72 delay the second clock signal T2, so that it is passed to the clock inputs of the sampling flipflops 63, 64 and 65 at different times. The selection signal SEL', which is emitted from the output Q of the flipflop 61, is sampled at three different times. If the selection signal SEL' changes from a high level to a low level, or vice versa, during this time period, then this is registered by at least one of the three sampling flipflops 63, 64 or 65.

By way of example, the selection signal SEL results in switching from the register device 6 to the register device 7. A rising clock flank of the first clock signal T1 thus results in the data word DW which has been applied to the data input 41 being transferred to the register bank 7, and at the same time producing a positive flank of the selection signal SEL' at the output Q of the flipflop 61. The positive flank at the output of the flipflop 61 occurs, for example, at a time which is slightly later than the rising clock flank of the second clock signal T2. On a rising clock flank of the second clock signal T2, the first sampling flipflop 63 thus still registers the selection signal SEL' as being at a low level at its data input, and emits this in an inverted form at its output QN.

The rising clock flank of the second clock signal T2 is delayed by the delay element 71. If the selection signal SEL' changes to the other level during this delay time, then this is registered by the sampling flipflop 64 and by the sampling flipflop 65, and a correspondingly inverted signal is emitted at their outputs QN. This indicates that the register device 7 now contains the next data word, and its output should be coupled to the output 42 of the interface apparatus 4.

Switching of the register banks from the bank 6 to the bank 7 is identified by a positive flank in the selection signal SEL or SEL', respectively, while switching of the register device from the device 7 to the device 6 is represented by the corresponding negative flank. The sampling flipflops 63, 64 and 65 detect this change in the selection signal at different times, because of the delay elements which are connected to their clock inputs. In this case, the logic levels 0-0-1 or 0-1-1 for the inverting outputs QN of the sampling flipflops 63, 64 and 65 identify a negative clock flank of the selection signal SEL', and thus a change in the registration device from 7 to 6. The sequence 1-0-0 and 1-1-0 of the output levels identifies a positive change of the selection signal SEL', and thus a change of the register device from 6 to 7.

The output of the first sampling flipflop 63 is connected to an inverter 81, and to a first input of a NAND gate 82. The inverting output QN of the sampling flipflop 64 is connected to a second input of the gate 82. The inverted output QN of the flipflop 65 is connected to an inverter 83, and to a third input of the NAND gate 82. The outputs of the inverters 81 and 83 are connected to the inputs of a NAND gate 84. The output of the NAND gate 82 is connected to the first input of a NAND gate 85. The outputs of the two NAND gates 84 and 85 are connected to a further NAND gate 86. Its output is connected to a data input of a selection flipflop circuit 90.

The clock input of the selection flipflop circuit 90 is connected via a further delay element 73 to the second delay element 72. The inverted output QN of the selection flipflop 90 is fed back to the second input of the logic NAND gate 85. Furthermore, it is connected to the control input 81 of the selection circuit 8 via an inverter 91, which forms the output 55 for the control signal MUX. The complete logic circuit comprising the logic gates 81 to 86 as well as the selection flipflop 90 produces the control signal MUX from the information data emitted from the sampling flipflops.

The control signal MUX connects the selection switch 8 to the input to which the next data word to be emitted at the data output 42 has been applied. The toggle flipflop 90, which is driven by a positive clock flank of the second clock signal T2 delayed by the delay devices 71, 72 and 73, thus emits a control signal MUX to the control input 81 of the selection means 8. The data emitted from the register device 6 or 7 is transferred from the buffer circuit 9A reliably with the next falling clock flank of the second clock signal T2, and is emitted to the data output 42.

In this case, the time delay to the second clock signal produced by the delay element 73 is sufficiently long. The logic circuit comprising the gates 81 to 86 has already switched over completely, before the rising clock flank of the clock signal T2 switches the output QN of the toggle flipflop 90. Furthermore, there is still sufficient remaining time before the falling clock flank of the second clock signal T2 results in the data word which has been emitted from the multiplexer 8 being applied to the output 42 of the interface apparatus 4.

The selection flipflop 90, the inverter 91 and the selection circuit are then already switched over. The delays required for this purpose define the maximum sampling frequency of the first and of the second clock signal.

FIG. 4 shows a time profile of various signals. The first curve shows the first clock signal T1 at a specific frequency. After a first clock period ΔT1, the selection signal SEL is switched from the logic low level 0 to the logic high level 1. After a further clock period ΔT2, the selection signal SEL is inverted again by the toggle flipflop 60. As can be seen, the toggle flipflop acts as a frequency divider for the first clock signal T1. The selection signal SEL is supplied together with the first clock signal to the logic gates 606 and 607.

The logic operation and the inversion process following it by the inverters 605 and 604 result in the output signals R1 and R0. As can clearly be seen, the duty ratio is 1:3, with the duration of the logic high level for the respective selection signal R1 or R0 lasting for only half the clock period of the first clock signal T1. Furthermore, the two signals R1 and R0 are phase-shifted with respect to one another by half the period of their clock period. The respective rising flank of the signal R1 or R0 always occurs at the time of a rising flank of the first clock signal.

With each rising clock flank of the signal R1, the register device 7 receives a data word DW which has been applied to the input. The same applies to the register device 6, which also receives a data word which has been applied to the input, with each rising clock flank of its clock signal R0. A data word which has been applied to the data input is thus transferred to the respective register device alternately on each rising clock flank of the first clock signal T1.

At the time Tx, the selection signal SEL produces a change from the logic low level to the logic high level, which indicates that the data word which has been applied to the input will be transferred to the register device 7 on the next rising clock flank of the first clock signal T1.

The selection signal SEL is, however, transferred by the flipflop 61 only with the subsequent rising clock flank of the clock signal T1, and is emitted as the selection signal SEL' at its output Q. It has thus been phase-shifted through half one period with respect to the selection signal SEL produced by the D-toggle flipflop 60. The selection signal SEL' has a rising flank at the time of a rising flank of the signal R1, and a falling flank on a rising flank of the signal R0. At the time at which the register device 7 receives a data word, the selection signal SEL' is thus applied with a logic high level to the respective data inputs of the sampling flipflops 63 to 65. This is also associated with the register device 7.

The output clock, provided by the second clock signal T2, is phase-shifted through 90° with respect to the first clock signal T1. A rising flank occurs in the second clock signal T2 at the time Tz at which the selection signal SEL' has not yet changed. The sampling flipflop 63 therefore does not register any level change in the selection signal SEL'. However, the rising clock flank of the second clock signal T2 is delayed by the delay elements 71 and 72, and is passed to the respective clock inputs at later times. The sampling flipflops register a level change, which they emit at their outputs. The new logic levels 1-0-0 which are applied to the inputs of the logic gates 81, 82 and 83 are processed by them and are used to produce a signal at a logic high level, which is supplied to the data input D of the selection flipflop 90. After a further delay by the delay unit 73, the rising flank of the clock signal T2 reaches the clock input of the flipflop 90, producing a logic low level at its inverted output. The information as to which register bank has currently been written to, as well as the previous position of the multiplexer 8, is thus evaluated by the selection flipflop 90. The first information item is obtained from the selection signal SEL', and the second is obtained from the output of the selection flipflop 90 itself. The output level of the selection flipflop 90 changes only when the selection signal SEL' changes.

In this exemplary embodiment, the register device 7 passes the data word which has been applied to its data input D to its output Q at approximately the same time, on the basis of a rising clock flank in the signal R1. It is thus produced at the output 83 of the multiplexer unit 8. The control signal MUX, which has been emitted from the flipflop 90 and has been inverted by the inverter 91, is applied to the control input 81 of the switching device 8. The switching device 8 then connects the input 83 to its output, and thus supplies the data word which has been emitted from the register device 7 to the input D of the output buffer circuit 9A. On the next falling clock flank of the clock signal T2, the data word is emitted from the output buffer circuit 9A to the data output 42 of the interface apparatus 4.

The selection signal SEL' changes to the logic low level at the time Ty, thus indicating that the register device 6 has received the next data word. On the next rising clock flank of the second clock signal T2, this change in the selection signal SEL' is registered again, in response to which the selection flipflop 90 produces a control signal to switch the selection switch 8.

The invention is thus based on two register devices to which data is written alternately, with the respective other register device always being read from. This ensures that the data is not erroneous. The synchronization between the two circuit blocks, or between the two clock signals at the same frequency, but with a different phase, takes place at the point which defines a selection for reading of the register devices. This is the flipflop 61, which indicates the register device to which new data has already been applied. The synchronization process is carried out by time comparison of the level change in the selection signal with the second clock signal. The reading process can thus be carried out with a new flank of the second clock signal T2, which connects the selection switch 8 to the corresponding register bank. The data is transferred to the output buffer 9 with the subsequent falling clock flank of the second clock signal. There is therefore no need for additional flipflop circuits for the register devices in a conventional synchronization circuit.

The exemplary embodiment described here makes use of flipflop circuits controlled by positive clock flanks.

The invention is, of course, not restricted to this. It can also be implemented using flipflops controlled by negative clock flanks. Instead of sampling flipflops, a different comparison logic is feasible, which produces a time relationship between the first and the second clock signal. If the subsequent logic is suitably designed, there is no need for the inverting outputs QN of the sampling flipflops. The logic which links the selection signal SEL' to the signal MUX can also be implemented in any other desired form. In this case, the logic inverts the signal MUX, which switches the selection means, whenever a level change occurs in the signal SEL'. The logic gates need not be in the form of AND gates but may also be in the form of NAND gates with inverters. The entire circuit can be implemented using either CMOS logic or else pure MOS logic.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising." Additionally, the term "exemplary" is intended to indicate an example and not a best or superior aspect or implementation.

The invention claimed is:

1. An interface apparatus for synchronous interchange of a data word between two circuit blocks comprising:
   a data input configured to receive a data word, and a data output configured to output the data word;
   a first register device and a second parallel-connected register device, each having an input coupled to the data input, a selection input, and an output, and each configured to store a data word applied on the input side and to emit the data word at the respective output;
   a selection circuit, connected to the output of the first register device and to the output of the second register device, and configured to selectively couple the output of the first or the second register device to the data output as a function of a control signal provided thereto;
   a first clock input configured to receive a first clock signal;
   a second clock input configured to receive a second clock signal;
   a synchronization circuit, coupled to the first and the second clock input and having a control output coupled to the selection circuit, and configured to emit a selection signal that is derived from the first clock signal for selection of the first or the second register device for storage of a data word applied to the data input, and wherein the synchronization circuit further comprises a sampling apparatus which is clocked with the second clock signal and is configured to emit the control signal at the control output, wherein the control signal is derived from the selection signal and the second clock signal, and wherein the sampling apparatus is configured to detect a change in the selection signal, and wherein the sampling apparatus comprises a first and at least one second flipflop circuit having data inputs configured to receive the selection signal, with a clock input of the first flipflop circuit being connected to the second clock input, and a clock input of the at least one second flipflop circuit being connected via at least one first delay element in order to delay the second clock signal in time, to the second clock input.

2. The interface apparatus of claim 1, wherein the first and the second register device each comprise a clock signal input which respectively forms the selection input for the first and the second register device, and wherein the first and the second register device are configured to emit a data word which is applied to their respective data input at their output on a flank of a clock signal coupled thereto respectively, which is derived from the selection signal.

3. The interface apparatus of claim 1, further comprising a first buffer circuit connected between the data input of the interface apparatus and the first and second register devices, and configured to emit a data word which has been applied to the data input of the interface apparatus to the first and second register devices on a clock flank of the first clock signal.

4. The interface apparatus of claim 1, further comprising a second buffer circuit connected between the selection circuit and the data output of the interface apparatus, and configured to emit a data word which is applied to the selection circuit to the data output on a clock flank of the second clock signal.

5. The interface apparatus of claim 1, wherein the synchronization circuit comprises a second selection circuit which is configured to produce the selection signal for selection of the respective other register device during each clock period of the first clock signal.

6. The interface apparatus of claim 5, wherein the second selection circuit comprises a flipflop circuit which is clocked with the first clock signal and whose data output is connected via an inverter to a first input of a first logic gate, to a first input of a second logic gate, and via the inverter to its data input.

7. The interface apparatus of claim 6, wherein a second input of the first logic gate and a second input of the second logic gate are coupled to the first clock input, and the output of the first logic gate is coupled to the selection input of the first register device, and the output of the second logic gate is coupled to the selection input of the second register device.

8. The interface apparatus of claim 6, wherein the first and the second logic gate each comprise a logic AND gate.

9. The interface apparatus of claim 1, wherein the selection circuit is configured to assume two states, with the output of the first register device being coupled to the data output of the interface apparatus in a first state, and with the output of the second register device being coupled to the data output of the interface apparatus in a second state.

10. The interface apparatus of claim 1, wherein the sampling apparatus further comprises a third flipflop circuit having a clock input coupled via a second delay element to the second clock input, and a data input connected via at least one logic gate to the data outputs of the first and the at least one second flipflop circuit.

11. The interface apparatus of claim 10, wherein the clock input of the third flipflop circuit is connected via the second delay element and the at least one first delay element to the second clock input.

12. A method for synchronization of a data word between two circuit blocks which are clocked at the same frequency, comprising:
provuding a first register device and a second register device for alternating storage of a data word which is emitted from the first circuit block;
selecting one of the two register devices based on a state of a selection signal which is associated with the respective register device, comprising:
producing the selection signal at a first logic level and at a second logic level, which is inverted with respective clock periods of a first clock signal, wherein the first logic level is associated with the first register device, and the second logic level is associated with the second register device;
transferring the data word emitted from the first circuit block to the selected register device at a timing associated with a clock flank of the first clock signal;
detecting a state change in the selection signal with a second clock signal and a delayed version of the second clock signal;
determining a time at which the data word can be emitted from the selected register device to the second circuit block;
transferring the data word which has been received in the selected register device to a second circuit block after detection of the occurrence of a clock flank of the second clock signal.

13. The method of claim 12, wherein selecting one of the two register devices comprises:
applying the selection signal and the first clock to a first logic gate; and
inverting the selection signal and applying the inverted selection signal and the first clock signal to a second logic gate.

14. The method of claim 12, wherein selecting one of the two register devices comprises:
producing a third and a fourth clock signal at half the clock frequency of the first clock signal, with the third clock signal having a phase shift of half the clock period with respect to the fourth clock signal; and
supplying the third and fourth clock signals to a respective clock input of the first and second register devices, wherein the register devices are configured to receive a data word which has been emitted from a first circuit block on each clock flank of the third and fourth clock signals, respectively.

15. The method of claim 12, wherein transferring the data word comprises:
producing a control signal;
switching a switching device using the control signal; and
transferring the data word to the second circuit block on the occurrence of a clock flank of the second clock signal.

16. An interface apparatus for synchronous interchange of a data word between two circuit blocks comprising:
a first register device and a second register device, respectively comprising an input for receiving a data word, a selection input, and an output for emitting the data word, and respectively configured to store the data word;
a selection circuit, coupled to the output of the first register device and to the output of the second register device, and configured to selectively couple the output of the first or the second register device to a data output of the interface apparatus as a function of a control signal provided thereto;
a first clock input configured to receive a first clock signal;
a second clock input configured to receive a second clock signal;
a synchronization circuit, coupled to the first and the second clock input and having a control output coupled to the selection circuit, and configured to emit a selection signal that is derived from the first clock signal for selection of the first or the second register device for storage of a data word applied to the input respectively, and wherein the synchronization circuit further comprises a sampling apparatus which is clocked with the second clock signal and is configured to emit the control signal at the control output, wherein the control signal is derived from the selection signal and the second clock signal, and wherein the sampling apparatus is configured to detect a change in the selection signal, and wherein the sampling apparatus comprises a first and at least one second flipflop circuit having data inputs configured to receive the selection signal, with a clock input of the first flipflop circuit being coupled to the second clock input, and a clock input of the at least one second flipflop circuit being coupled via at least one first delay element in order to delay the second clock signal in time, to the second clock input.

17. The interface apparatus of claim 16, wherein the synchronization circuit comprises a second selection circuit which is configured to produce the selection signal for selection of the respective other register device during respective clock periods of the first clock signal, the selection signal comprising a first logic level and a second logic level, which is inverted with respective clock periods of the first clock signal, wherein the first logic level is associated with the first register device, and the second logic level is associated with the second register device.

18. The interface apparatus of claim 16, wherein the first and the second register device respectively comprise a clock signal input which respectively forms the selection input for the first and the second register device, and wherein the first and the second register device are configured to emit a data word which is applied to their respective input at their output on a flank of a clock signal coupled thereto respectively, which is derived from the selection signal.

19. The interface apparatus of claim 18, comprising:
a third and a fourth clock input configured to receive a third and a fourth clock signal respectively at half the clock frequency of the first clock signal, with the third clock signal having a phase shift of half the clock period with respect to the fourth clock signal; and
wherein the respective clock input of the first and second register devices is configured to receive the third and the fourth clock signal, wherein the register devices are configured to receive a data word which has been emitted from a first circuit block on a respective clock flank of the third and fourth clock signals, respectively.

20. The interface apparatus of claim 16, comprising a first buffer circuit coupled between a data input of the interface apparatus and the first and second register devices, and configured to emit a data word which has been applied to the data input of the interface apparatus to the first and second register devices on a clock flank of the first clock signal.

* * * * *